United States Patent
Allen

[11] 3,809,885
[45] May 7, 1974

[54] SEDIMENTOMETER

[76] Inventor: Terence Allen, 2 Strickland Cl., Shadwell, Leeds 17, Yorkshire, England

[22] Filed: Jan. 13, 1971

[21] Appl. No.: 106,013

[30] Foreign Application Priority Data
Jan. 14, 1970  Great Britain ..................... 1764/70

[52] U.S. Cl. ........................................... 250/357
[51] Int. Cl. .......................................... G01n 23/12
[58] Field of Search ..... 250/43.5 D, 43.5 FL, 83.30, 250/83.6 R

[56] References Cited
UNITED STATES PATENTS
3,449,567   6/1969   Oliver et al. .................. 250/43.5 D
3,588,504   6/1971   Laundy ......................... 250/43.5 D
3,452,192   6/1969   Hanken ......................... 250/43.5 D Primary Examiner—James W. Lawrence
Assistant Examiner—Davis L. Willis
Attorney, Agent, or Firm—Browne, Beveridge, DeGrandi & Kline

[57]  ABSTRACT

The invention provides an X-ray sedimentometer which uses an isotope X-ray source, both the X-ray source and detector being adapted to be driven relative to the sedimentation tank to take readings at different depths.

5 Claims, 5 Drawing Figures

PATENTED MAY 7 1974　　　　　　　　　3,809,885

INVENTOR:
TERENCE ALLEN
BY
Beveridge + DeGrandi
ATTORNEYS

SEDIMENTOMETER

The present invention relates to an X-ray sedimentometer.

In the field of powder technology a great deal of effort has been applied to the design of instrument and techniques for carrying out analyses of the particle size distribution in powders. This is a basic property of powders and there has been a long felt need for an instrument which will give the weight distribution of powder samples in suspension quickly and reliably with the minimum of interference.

The use of an X-ray beam to detect the changes of powder concentration with time and depth of a settling suspension, in order to determine the weight distribution of the solid phase has been recognised for some time, but the cost and complexity of the equipment has restricted its use and development.

The main advantages of the use of X-rays over most other techniques are that the suspension is not disturbed during the taking of readings; there is no diffraction on small particles as occurs with photo-sedimentation techniques; the weight distribution is obtained directly whereas photo-sedimentation gives the surface distribution; and the time necessary for a full size analysis can be 30 mins. or less.

The X-ray beam passes through a sedimentation tank which contains particles in a fluid medium and the intensity of the emerging beam is measured. The particle size distribution of particles is determined by measuring the changing concentration with time and height of fall for a settling system. The intensity of the beam with a clear liquid in the tank will be greater than the intensity when it contains a suspension if the mass absorption coefficient of the powder in suspension is greater than that of the liquid, the difference in intensity being related to the concentration of powder in the beam.

In previous equipment a continuus X-ray source requiring high voltage high current supply together with water cooling was used which, due to the instability in output, necessitated the use of a reference arm to correct for zero fluctuations. In the present invention an isotope source is used which, due to its excellent stability eliminates the need for a reference arm and requires simpler voltage current supply and detector. This makes the design simpler since only the sedimentation tank and detector are necessary. In addition the design is more robust, cheaper and permits the use of a scanning device to speed up analysis. Further, the use of a single detector reduces statistical errors in output by a factor of $\sqrt{2}$.

According to the present invention there is provided an X-ray sedimentometer which comprises a sedimentation tank, an isotope X-ray source at one side of said tank and a proportional counter positioned at the opposite side of the tank to the X-ray source, as detector, the X-ray source and counter being adapted to be moved so as to take measurements at different depths in said tank.

The X-ray source is preferably an isotope with a medium-long half life so that its activity remains substantially constant during an analysis. A suitable isotope is Pm 147/A1 which has a half life of 2.6 years and an energy level of 22.6 kev. A satisfactory activity is 3 curie (cu). If the isotope has a higher activity, it may be reduced to 3 cu by using a narrower beam. This has the small advantage of increasing the resolution.

The proportional counter may be a Xenon filled counter, the output of which may be fed to a preamplifier, amplifier and rate meter, the output of which is displayed on a pen recorder. The rate meter may be fitted with a zero suppression control which, together with a range switch makes it possible to enlarge the magnitude of the output by various factors, e.g. a factor of 3 or 10. Statistical variations in the detector output are smoothed out by count integrated circuits. A rate meter having a zero suppression control, and count integrated circuits should be used in order to enable an isotope X-ray source to be used in the sedimentometer.

Both the X-ray source and the detector are adapted to be driven relative to the tank, e.g. by a small electric motor, to enable concentration determinations to be carried out at any desired depth. The exact position of the beam may be determined by a revolution counter connected with moving screws which are connected to the motor by suitable gearing. A timing device may be incorporated to switch the motor on after a pre-set time and the scan may be arrested where desired by a microswitch or the like.

The sedimentation tank may be a simple vertical tank, the suspension serving under the influence of gravity. The vertical tank is useful for particle sizes in the range of from about 1 to 75 microns, although the upper limit may be raised considerably by adjusting the viscosity of the suspending liquid.

If the particle sizes are smaller than 1 micron, a disc shaped tank with a central inlet may be used and this enables particle sizes down to about 0.01 microns to be evaluated. The disc is attached to a motor and caused to revolve, and the suspension is monitored with the X-ray beam at a known distance from the centre as with the vertical tank. The X-ray source and detector may be moved radially to take measurements at different distances from the centre.

In known apparatus using an ordinary X-ray source it has been proposed to move the tank relative to the source and detector since a tube X-ray source is very difficult to move. This has the disadvantage of disturbing the suspension and the centrifuge type of tank can not be scanned. The use of an isotope X-ray source avoids the disadvantage of moving the tank and disturbing the suspension and enables a centrifuge type of tank to be scanned.

The particle size may be determined by the application of Stokes' Law and the fraction undersize is equal to the relative concentration for that size.

The invention will be illustrated by way of example with reference to the accompanying drawings, in which.

Figure 1:
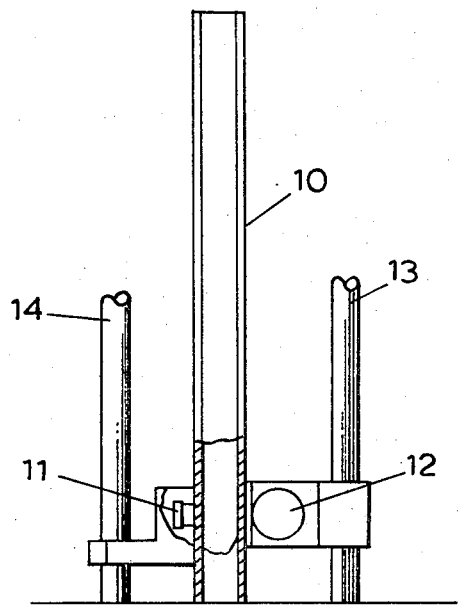
FIG. 1 is a side view of the apparatus of the invention.
Figure 2:
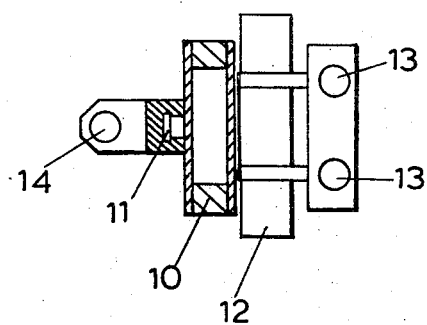
FIG. 2 is a plan view of the apparatus shown in FIG. 1.
Figure 3:
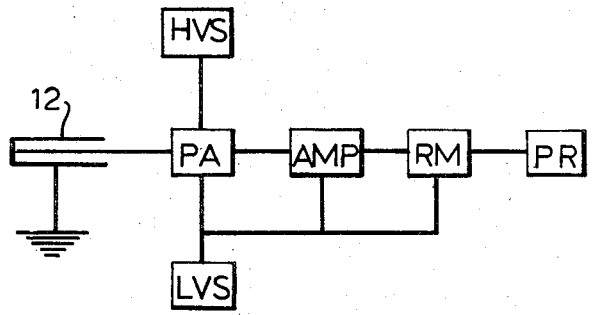
FIG. 3 is a black diagram of the electrical equipment used.

Referring to FIGS. 1 and 2, sedimentation tank 10 has an isotope X-ray source 11 and proportional counter 12 on opposite sides thereof. Source 11 and counter 12 are mounted on pillars 13, 14 for raising and lowering relative to tank 10 so that determinations may be made at different heights. Referring now to FIG. 3 the output from counter 12 is fed to pen recorder (PR) by way of a preamplifier (PA), amplifier (AMP), and ratemeter (RM). HVS and LVS refer respectively to high voltage supply and low voltage supply.

Operation of the apparatus may be carried out as follows.

The intensity $I_c$ with clean liquid in the tank is recorded. A suitable range selected (a magnification of 1, 3 or 10) depending on the mass absorption coefficient of the material under examination and the zero is suppressed to get the deflection on to the pen recorder paper. The powder then added and the suspension well stirred. Sedimentation is detected during the pre-set time in the stable position of the beam, at least unless the largest particles in suspension reach the given depth. Scanning up the tank commences at a known speed. The graph obtained is of intensity against time and this has to be converted to density (i.e. log (Intensity) which is proportional to the powder concentration in order to evaluate the sedimentation curve. To facilitate this conversion a special density ruler has been constructed as follows.

For an incident beam of intensity $I_c$ passing through two walls of a sedimentation tank of combined thickness $x$, density $P$ and mass absorption coefficient $\mu$ and also through a suspension length $L$ containing liquid and solid of absorption coefficients and densities respectively $\mu_1, \mu_2, P_1, P_s$ at a volume concentration $c$ the emergent beam will be of intensity $I = I_c \exp[-\mu p x - \mu_1 P_1 (1-c) L - \mu_s P_s c L]$
$= A\, I_c \exp[-(\mu_s P_s - P_1 P_1) c L]$ i.e. $I = A \exp[-Bc]$ where A and B are constants.

For clear liquid $I = I_c = A$.

$I = I_c \exp[-Bc]$ hence $Bc = -\log[1 - (I_c - I)/I_c]$

Defining $Bc$ as density D the relationship between relative deflection of the pen recorder and powder concentration is given by the above equation.

| Length of Ruler (arbitrary units) $(I_c-I)/I_c$ | Optical Density D |
|---|---|
| 0 | 0 |
| 0.206 | 0.1 |
| 0.369 | 0.2 |
| 0.499 | 0.3 |
| 0.062 | 0.4 |
| 0.684 | 0.5 |
| 0.749 | 0.6 |
| 0.800 | 0.7 |
| 0.841 | 0.8 |
| 0.874 | 0.9 |
| 0.900 | 1.0 |
| 1.0 | |

Figure 4:
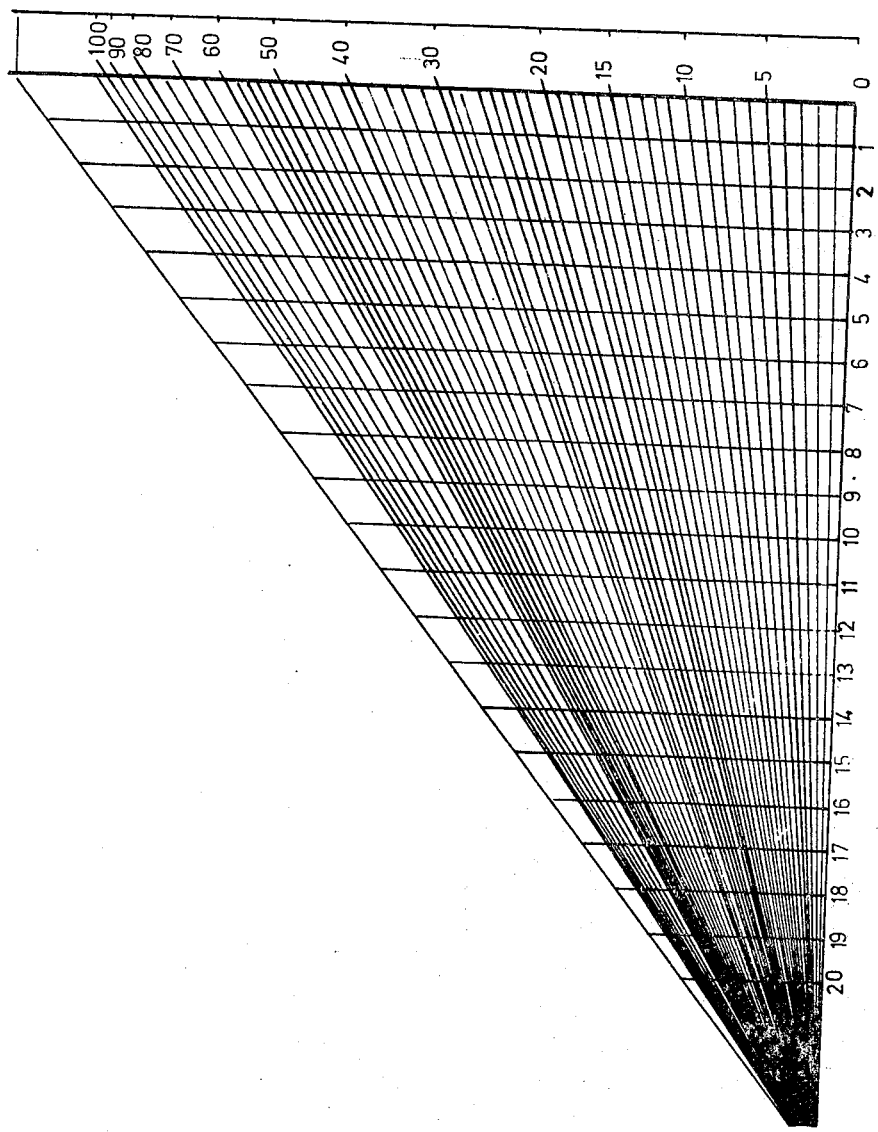
FIG. 4 shows a ruler constructed for use in the present invention.

Since the value of $I_c$ depends on the nature of the liquid it is necessary to construct a ruler which has a length that may be varied over the width of the pen recorder chart (see FIG. 4). Similar rulers have also been constructed for the lower density regions to cope with the magnified ranges of $\times 3$ and $\times 10$.

The intensity recorded by the pen recorder is converted into density using the applicable one of the above rulers. This density is proportional to the solids concentration within the beam which in turn is proportional to the weight fraction undersize the Stokes' diameter applicable to the time and depth of fall. Hence the cumulative percentage undersize by weight is obtainable.

Figure 5:
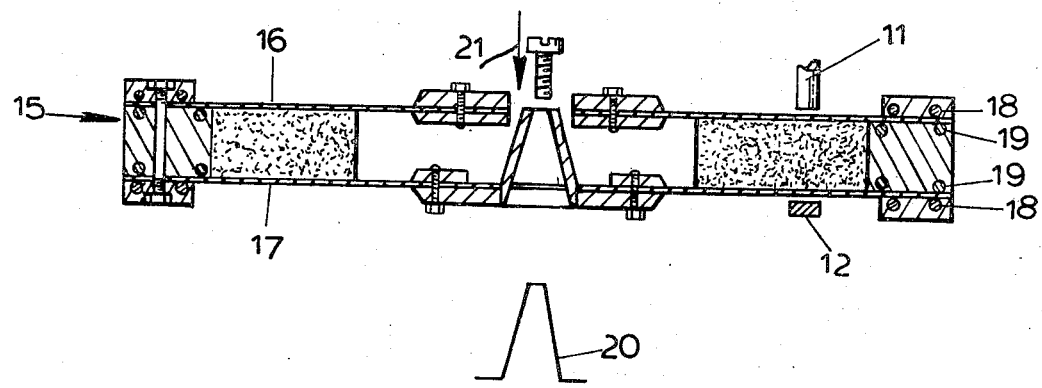
FIG. 5 is a cross-sectional view through a centrifuge type tank.

Referring to FIG. 5, a disc centrifuge 15 comprises perspex discs 16, 17 with stainless steel edge 18 and rubber 'O' — rings 19. The disc 15 is fixed to two-speed motor 20 which may rotate at 750 and 1500 or 1,500 and 3,000 rpm. X-ray source 11 and counter 12 are positioned on one side of the centre and are movable radially. The suspension is fed into the disc centrifuge 15 as shown by arrow 21.

The solution to the relationship between concentration and size distribution is more complex than for the gravitational case being available as an approximate general solution with simple particular solutions when fixed volumes of suspension are used. Alternatively the experimental data may be fed directly or indirectly to a computer for rapid evaluation.

A full analysis from 5 to 0.01 microns may be carried out in about 30 minutes.

The maximum X-ray density has been determined for different concentrations of several materials and found to be linear over the range used with the apparatus (0 to 1 percent v/v).

Two different size ranges of bronze powder were analysed and the analysis of 1:1 mixture by weight was compared with the graphical mixture of the individual analyses. The results obtained coincided very well.

The reproducibility has been checked many times with different powders to find whether there is any agglomeration or dilution taking place in suspension. If no such effect is present, the analysis of the same sample is highly reproducible independently of the liquid or other conditions of sedimentation (within the range of recommended volume concentration). Good reproducibility was obtained.

I claim:

1. An isotope X-ray sedimentometer which comprises a sedimentation tank, an isotope X-ray source at one side of said tank and a proportional counter similarly positioned at the opposite side of the tank to the X-ray source, including a detector, and means for mounting the X-ray source and proportional counter for simultaneous movement along said tank so as to enable measurements to be taken continuously at differing sedimentation positions therealong, wherein said tank is a horizontal disc centrifuge in which the suspension being measured settles radially by centrifugal force and said mounting means includes means for moving said source encounter simultaneously in a radial direction.

2. An X-ray sedimentometer as defined in claim 1 wherein the output from the proportional counter includes circuitry comprising a rate meter fitted with names for zero suppression control and count integrating means for smoothing out variations in the counter output corresponding to the non-uniformities in said tank and its contents.

3. An X-ray sedimentometer as defined in claim 1 which comprises a motor for moving said X-ray source and counter, a timing device for switching the motor on after a pre-set time and a microswitch for arresting the motor after it has moved the X-ray source and counter a predetermined distance.

4. An X-ray sedimentometer as defined in claim 3 which also comprises a revolution counter connected with moving screws which are connected to the motor by gearing means.

5. An X-ray sedimentometer as defined in claim 1 wherein said isotope X-ray source is P$m$ 147/A1.

* * * * *